United States Patent
Tremblay et al.

(10) Patent No.: US 10,437,071 B2
(45) Date of Patent: Oct. 8, 2019

(54) ADJUSTABLE PUPIL DISTANCE WEARABLE DISPLAY

(71) Applicant: North Inc., Kitchener (CA)

(72) Inventors: Eric Tremblay, Saint Sulpice (CH); Mickael Guillaumee, Neucha Tel (CH); David Ziegler, Lausanne (CH); Christophe Moser, Lausanne (CH); Philippe De Gol, Muraz (CH)

(73) Assignee: North Inc., Kitchener, ON (CA)

( * ) Notice: Subject to any disclaimer, the term of this patent is extended or adjusted under 35 U.S.C. 154(b) by 824 days.

(21) Appl. No.: 14/931,497

(22) Filed: Nov. 3, 2015

(65) Prior Publication Data

US 2017/0102548 A1 Apr. 13, 2017

Related U.S. Application Data

(60) Provisional application No. 62/240,395, filed on Oct. 12, 2015.

(51) Int. Cl.
*G02B 27/01* (2006.01)
*G06T 19/00* (2011.01)
*G06F 3/01* (2006.01)

(52) U.S. Cl.
CPC ..... *G02B 27/0179* (2013.01); *G02B 27/0103* (2013.01); *G02B 27/0172* (2013.01); *G06F 3/013* (2013.01); *G02B 2027/014* (2013.01); *G02B 2027/0132* (2013.01); *G02B 2027/0156* (2013.01); *G02B 2027/0174* (2013.01); *G02B 2027/0178* (2013.01); *G02B 2027/0185* (2013.01); *G06T 19/006* (2013.01)

(58) Field of Classification Search
CPC .... G02B 27/01–0189; G02B 2027/0105–0198
See application file for complete search history.

(56) References Cited

U.S. PATENT DOCUMENTS

| | | | | |
|---|---|---|---|---|
| 5,255,065 | A * | 10/1993 | Schwemmer | G01S 7/4811 356/4.01 |
| 7,190,518 | B1 * | 3/2007 | Kleinberger | G02B 27/0093 359/465 |
| 9,846,307 | B2 * | 12/2017 | Tremblay | G02B 26/10 |
| 9,870,049 | B2 * | 1/2018 | Raffle | G06F 3/013 |

(Continued)

FOREIGN PATENT DOCUMENTS

| | | | |
|---|---|---|---|
| JP | 2005221888 | 8/2005 | |
| JP | 2006209144 | 8/2006 | |
| WO | WO-2014155288 A2 * | 10/2014 | G02B 27/0172 |

OTHER PUBLICATIONS

International Search Report and Written Opinion received for PCT Patent Application No. PCT/US2016/055049, dated Dec. 15, 2016, 13 pages.

*Primary Examiner* — Patrick F Marinelli
(74) *Attorney, Agent, or Firm* — Thomas Mahon

(57) ABSTRACT

Disclosed herein are devices and methods to provide a display including a projection system and a removable lenses including a holographic optical element to receive light and reflect the light to an exit pupil. Each of the removable lenses may comprise a holographic optical element in a different position of the lens to change the position of the exit pupil. The projection system may project an image onto the holographic optical element to project the image to the exit pupil.

12 Claims, 16 Drawing Sheets

(56) References Cited

U.S. PATENT DOCUMENTS

| | | | |
|---|---|---|---|
| 9,880,441 B1* | 1/2018 | Osterhout | G02F 1/153 |
| 10,001,647 B2* | 6/2018 | Han | G02B 27/017 |
| 10,031,579 B2* | 7/2018 | Raffle | G06F 3/013 |
| 10,133,071 B2* | 11/2018 | Wade | G02B 27/0103 |
| 10,175,488 B2* | 1/2019 | Bailey | G02B 27/0172 |
| 10,197,805 B2* | 2/2019 | Bailey | G02B 27/0172 |
| 10,254,547 B2* | 4/2019 | Tremblay | G02B 27/0172 |
| 2002/0071472 A1* | 6/2002 | Dickson | G02B 5/32 372/102 |
| 2002/0180659 A1* | 12/2002 | Takahashi | G02B 27/225 345/4 |
| 2005/0007639 A1* | 1/2005 | Natarajan | G02B 5/32 359/15 |
| 2008/0007809 A1 | 1/2008 | Moss | |
| 2008/0186502 A1* | 8/2008 | Studer | G01B 11/105 356/450 |
| 2013/0009853 A1* | 1/2013 | Hesselink | G02B 27/017 345/8 |
| 2013/0083003 A1* | 4/2013 | Perez | G06F 3/005 345/419 |
| 2013/0141527 A1 | 6/2013 | Shimizu et al. | |
| 2013/0342570 A1* | 12/2013 | Kinnebrew | G09G 3/003 345/633 |
| 2014/0002442 A1* | 1/2014 | Lamb | G06F 3/1431 345/419 |
| 2014/0111838 A1* | 4/2014 | Han | G02B 27/017 359/13 |
| 2015/0036221 A1* | 2/2015 | Stephenson | G02B 27/0101 359/630 |
| 2016/0033771 A1* | 2/2016 | Tremblay | G02B 26/10 345/8 |
| 2016/0209654 A1* | 7/2016 | Riccomini | G02B 27/0172 |
| 2016/0238845 A1* | 8/2016 | Alexander | G03H 1/2645 |
| 2016/0327796 A1* | 11/2016 | Bailey | G02B 27/0172 |
| 2016/0349514 A1* | 12/2016 | Alexander | G06F 3/013 |
| 2016/0349515 A1* | 12/2016 | Alexander | G06F 3/013 |
| 2016/0349516 A1* | 12/2016 | Alexander | G06F 3/013 |
| 2017/0031435 A1* | 2/2017 | Raffle | G06F 3/013 |
| 2017/0068095 A1* | 3/2017 | Holland | B29D 11/00317 |
| 2017/0102548 A1* | 4/2017 | Tremblay | G02B 27/0172 |
| 2017/0205630 A1* | 7/2017 | Tremblay | G02B 27/0103 |
| 2017/0212349 A1* | 7/2017 | Bailey | G02B 27/0172 |
| 2017/0219829 A1* | 8/2017 | Bailey | G02B 27/0172 |
| 2017/0235144 A1* | 8/2017 | Piskunov | G02B 27/0081 359/13 |
| 2017/0293147 A1* | 10/2017 | Tremblay | G03H 1/0402 |
| 2018/0003973 A1* | 1/2018 | Wade | B29C 45/14 |
| 2018/0003974 A1* | 1/2018 | Wade | G03H 1/0256 |
| 2018/0003976 A1* | 1/2018 | Wade | G02B 27/0172 |
| 2018/0088328 A1* | 3/2018 | Wade | G02B 27/0103 |
| 2018/0107273 A1* | 4/2018 | Raffle | G06F 3/013 |
| 2018/0164592 A1* | 6/2018 | Lopes | G02B 27/00 |
| 2018/0182272 A1* | 6/2018 | McGlew | G09G 3/002 |
| 2018/0364482 A1* | 12/2018 | Georgiou | G02B 27/0172 |
| 2019/0041565 A1* | 2/2019 | Masson | G02B 5/32 |

\* cited by examiner

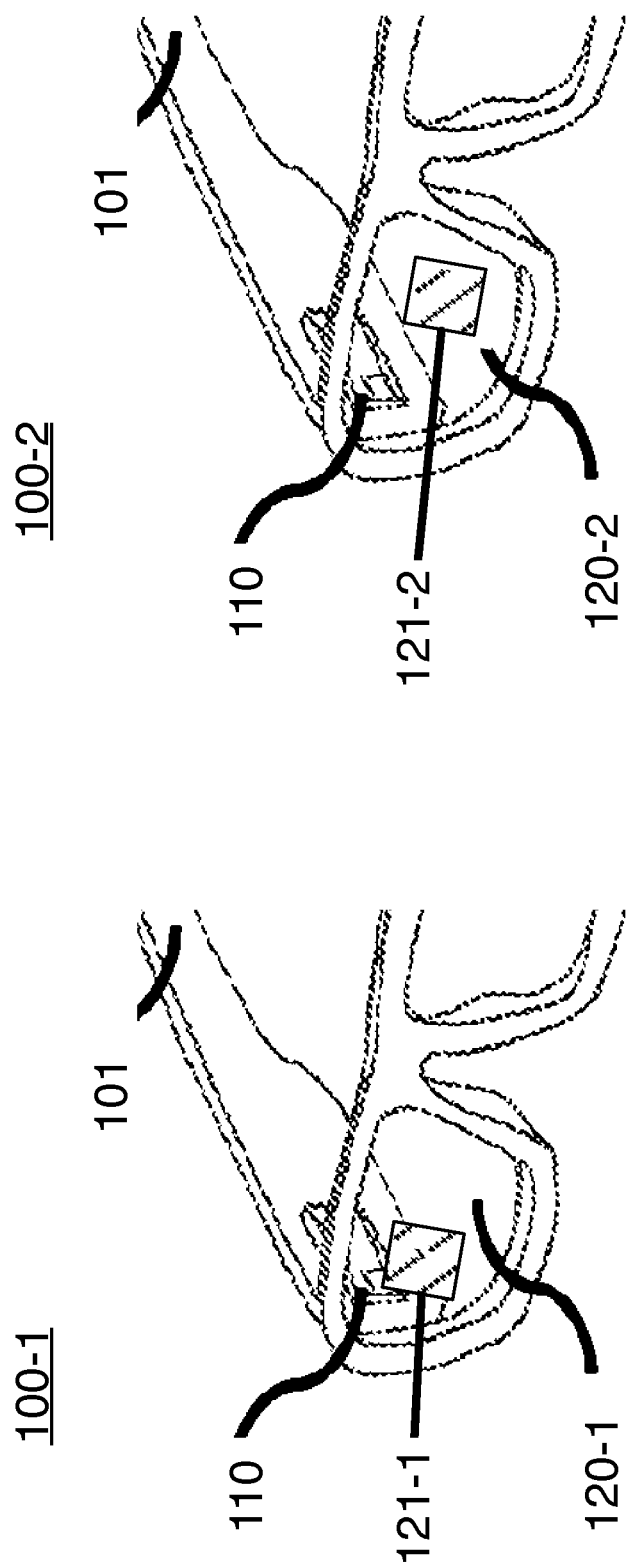

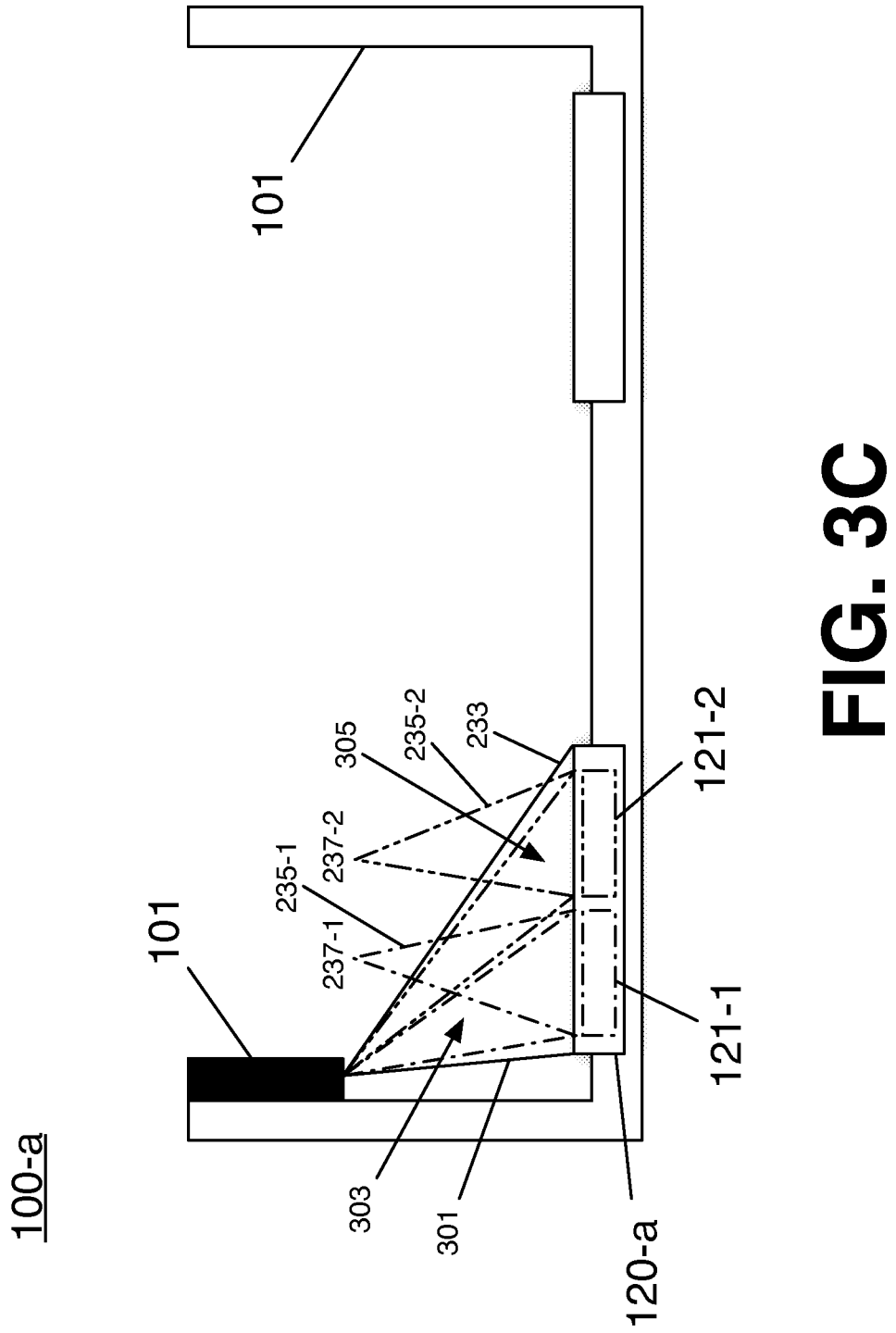

1000

```
┌─────────────────────────────────────┐
│ Project an object beam and a        │
│ reference beam to interfere with    │
│ each other to form an HOE having a  │
│ center in a first position of the   │
│ lens.                               │
│               1010                  │
└─────────────────────────────────────┘
                  │
                  ▼
┌─────────────────────────────────────┐
│ Displace at least one of the        │
│ reference beam, the object beam, or │
│ the lens to change the position of  │
│ the center along a horizontal       │
│ direction of the lens.              │
│               1020                  │
└─────────────────────────────────────┘
```

FIG. 10

ADJUSTABLE PUPIL DISTANCE WEARABLE DISPLAY

RELATED APPLICATIONS

This application claims the benefit of U.S. Provisional Application Ser. No. 62/240,395, filed Oct. 12, 2015, entitled "Adjustable Pupil Distance Wearable Display," which application is incorporated herein by reference in its entirety.

TECHNICAL FIELD

Embodiments herein generally relate to head worn displays and heads up displays; and in particular to a wearable display to accommodate a range of pupil distances.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

Adding to the difficulty in designing and manufacturing commercial HWDs is the range over which different user's physiology (e.g., interpupillary distance (IPD), or the like) can vary.

BRIEF DESCRIPTION OF THE DRAWINGS

FIGS. 3A-3C illustrate example implementations of the first system.

FIG. 10 illustrate an example second logic flow.

DETAILED DESCRIPTION

Figure 2:
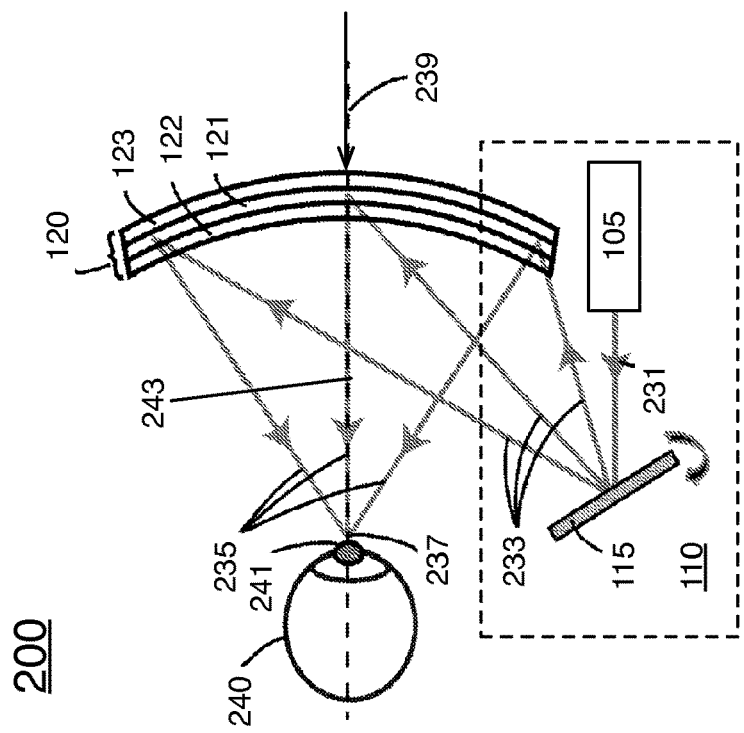
FIG. 2 illustrates an example second system.

Various embodiments may be generally directed to head worn displays (HWDs) and specifically to a HWD with interchangeable lenses. In general, HWDs provide a projection system and a lens that incudes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

It is to be appreciated that different user's may have different physiology, for example, a different interpupillary distance (IPD). More specifically, the distance between the eye pupils of one user may differ from that of another user. For example, two users with a different IPD may each wear a HWD (or similarly configured HWDs). The HWD may project an image to a lens with an HOE. The HOE may reflect the image to an exit pupil. When the HWD is worn by a first user, the exit pupil may be proximate to the first user's eye pupil. However, when the HWD is worn by a second user, the exit pupil may not be proximate to the second user's eye pupil as the second user has a different IPD than the first user (e.g., the second user's eyes are closer together than the first user's eyes, or the like). As such, the first user may correctly perceive the projected image but the second user may not.

It is noted, the configuration of the HOE affects the location of the exit pupil. More particularly, the location of the HOE in the lens and/or the optical characteristics of the HOE affect how and where the image is reflected. This is described in greater detail below. However, the present disclosure provides a HWD and lenses for a HWD with different HOEs. More specifically, the present disclosure provides a HWD configured to receive removable lenses. These removable lenses include an HOE. The HOE in one removable lens may be different (e.g., in a different location, with different optical characteristics, or the like) than the HOE in another removable lens to provide a HWD that can be provisioned for different IPDs.

Each of the HOEs in the removable lenses may be configured to reflect an image projected onto the HOE to an exit pupil in a particular location, where the exit pupil for one HOE may differ from the exit pupil of another HOE. For example, a first lens with a first HOE may be provided to reflect an image to a first exit pupil. A second lens with a second HOE may be provided to reflect the image to a second exit pupil. The first and second exit pupils may be displaced from each other, for example, in a horizontal direction. Accordingly, the HWD may be provisioned with either the first lens or the second lens to provide an exit pupil in either the first or second exit pupil location. As such, the HWD may be configured to provide an exit pupil (e.g., reflected image) in a first location for a first users with a first IPD (e.g., distance between pupils) or in a second location for a second user with a second IPD.

In some examples, the present disclosure provides a HWD frame with a fixed and/or integrated projection system and an interchangeable lens having an HOE configured to reflect an image to an exit pupil. The lens can be interchanged with another lens having another HOE, to provide for a different IPD value. With some examples, the projection system scans light over a projection surface (e.g., the lens) including an HOE to project an image onto the HOE. The lens including the HOE can be changed to account for a different IPD (e.g., an IPD of the intended user, or the like). The projection system can then be adjusted to project the image over the area corresponding to the changed HOE.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
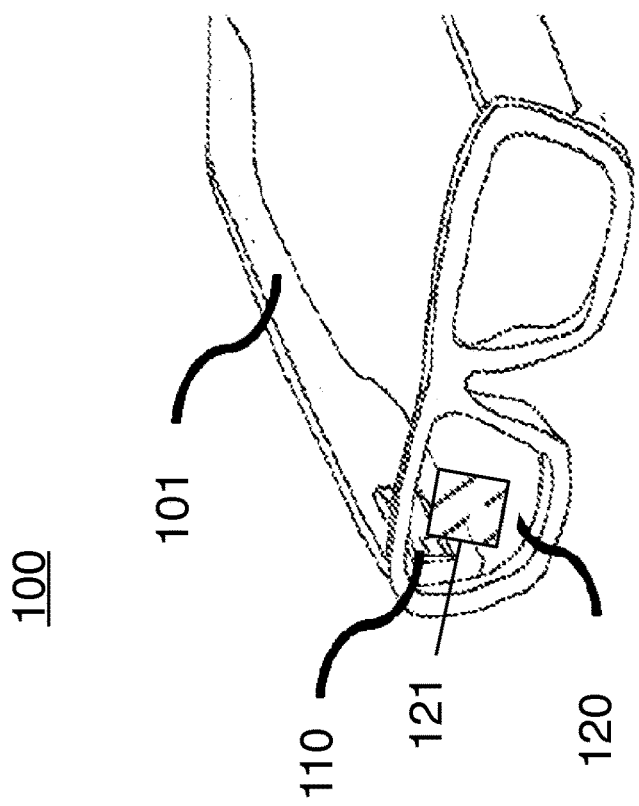
FIG. 1 illustrates an example first system.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 120, which may be a lens, such as, for example, a glasses lens as depicted. For convenience and clarity in discussing the present disclosure, the projection surface 120 is referenced as lens 120. However, embodiments are not limited in this context.

The lens 120 is removably mounted in the frame 101. The lens 120 includes an HOE 121 (also referred to as a holographic optical combiner). The HOE 121 may be in a particular location and/or have particular optical characteristics (e.g., refer to FIGS. 2 and 3A-3C) to selectively reflect light incident on the lens 120 to an exit pupil (e.g., the exit pupil 237 shown in FIG. 2).

During operation, the projection system 110 projects light onto the lens 120. The projected light can correspond to virtual images. The lens 120, and specifically the HOE 121, reflects (or redirects) the light towards a user's eye. More particularly the HOE 121 reflects the projected light (e.g., the projected image, or the like) to an exit pupil. This is described in greater detail with respect to FIG. 2. With some examples, the lens 120 and the HOE 121 redirect the projected images and also transmit light from the external environment to the user's eye. As such, a virtual image and a real world image may be presented to the user. It is noted, that although the device 100 is depicted with a single projection system 110 and lens 120, the device 100 may include a projection system 110 and lens 120 including an HOE 121 for each eye. Examples are not limited in this context. It is further noted, the device of this figure is implemented with lens 120. However, with some examples, the device 100 device 100 Additionally, examples discussed herein reference the lens 120, and particularly, the HOE 121 onto which images are projected.

With some examples, the projection system 110 may comprise a light source, battery, and projector to project images onto the HOE 121. For example, the projection system 110 may comprise a scanning mirror to reflect and redirect light from the light source onto the HOE 121. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 120 to project an image onto the HOE 121.

The lens 120 is described in greater detail below, for example, with respect to FIG. 2. However, a general description of the lens 120 is given here. With some examples, the lens 120 is an at least partially transparent surface with the HOE 121 disposed in the lens 120. During operation, the lens 120 and the HOE 121 may transmit light incident on a real world side of the lens 120 to provide a real world view. In some examples, the lens 120 is opaque and the lens 120 does not transmit light incident on a real world side of the lens 120. The HOE 121 may be disposed in a particular location of the lens 120 and/or may have particular optical characteristics to reflect an image projected onto an internal surface of the lens 120 to an exit pupil in a particular location. With some examples, the lens 120 may be sunglass lenses to reduce an amount or type of light transmitted through the lenses, for example, by polarization or absorption. With some examples, the lenses 120 may be prescription lenses to correct or augment light perceived from the real world and/or the virtual image.

Figure 4A:
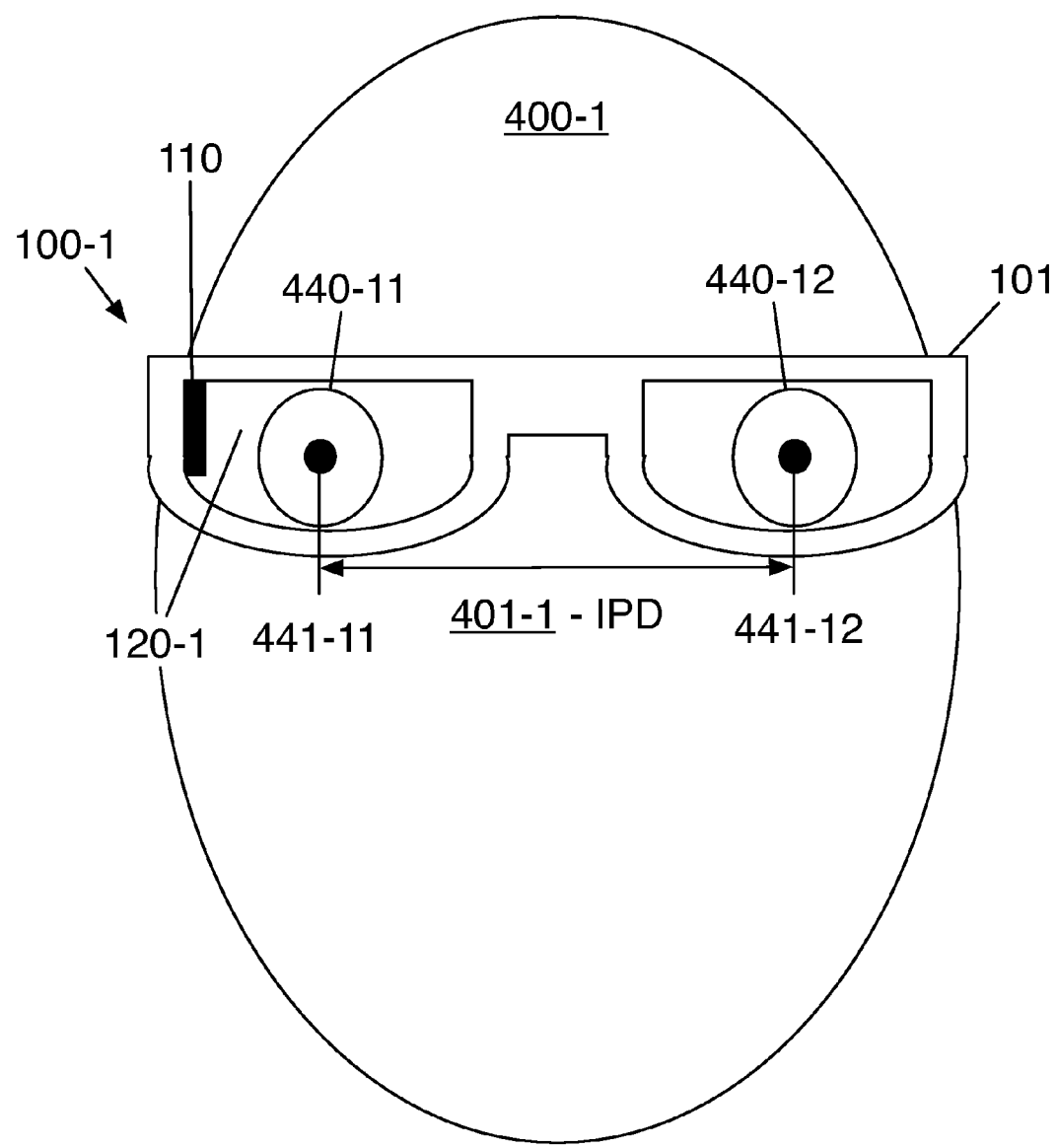
FIGS. 4A-4C illustrate example implementations of the first system.
Figure 4B:
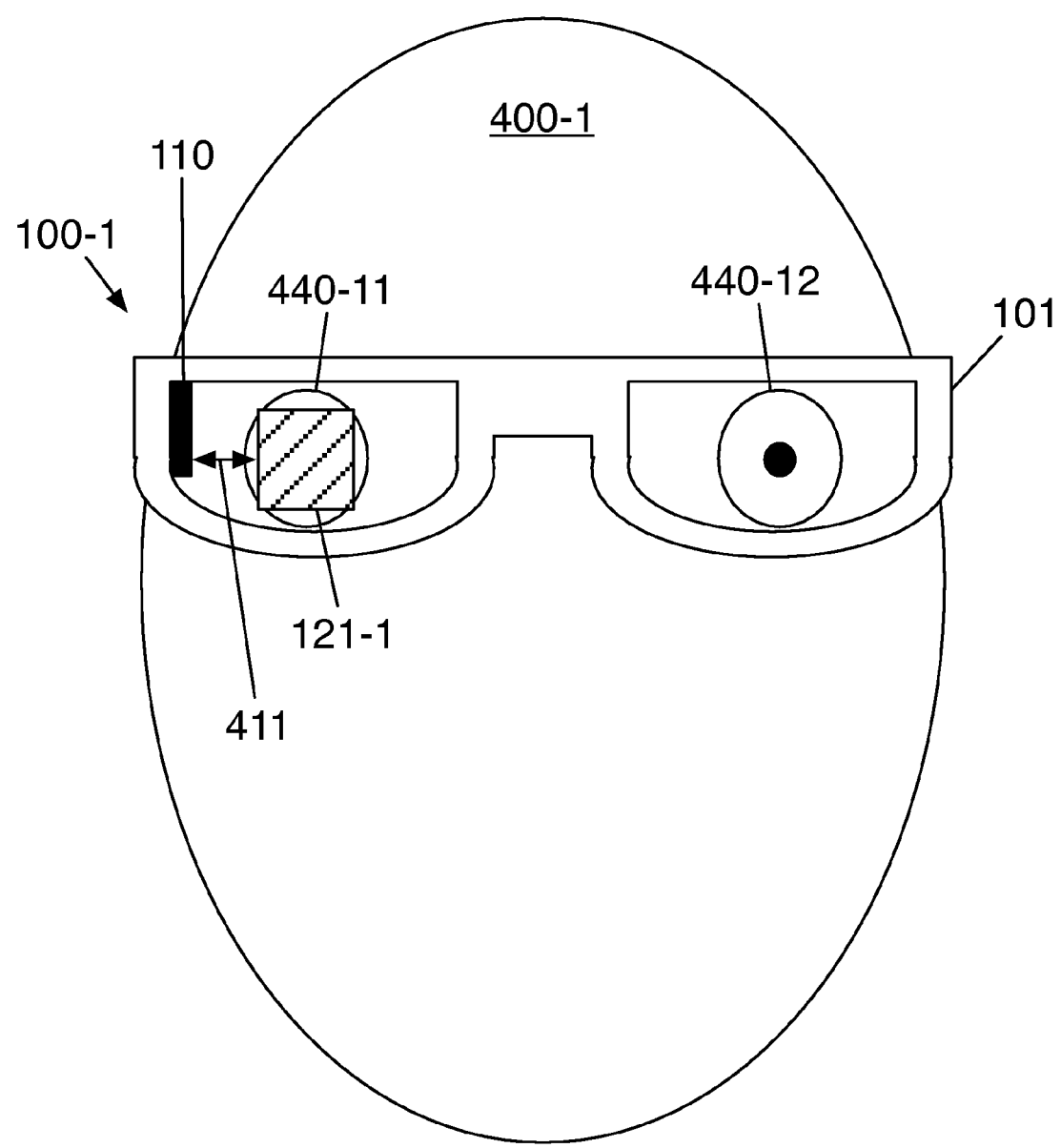
Figure 4C:
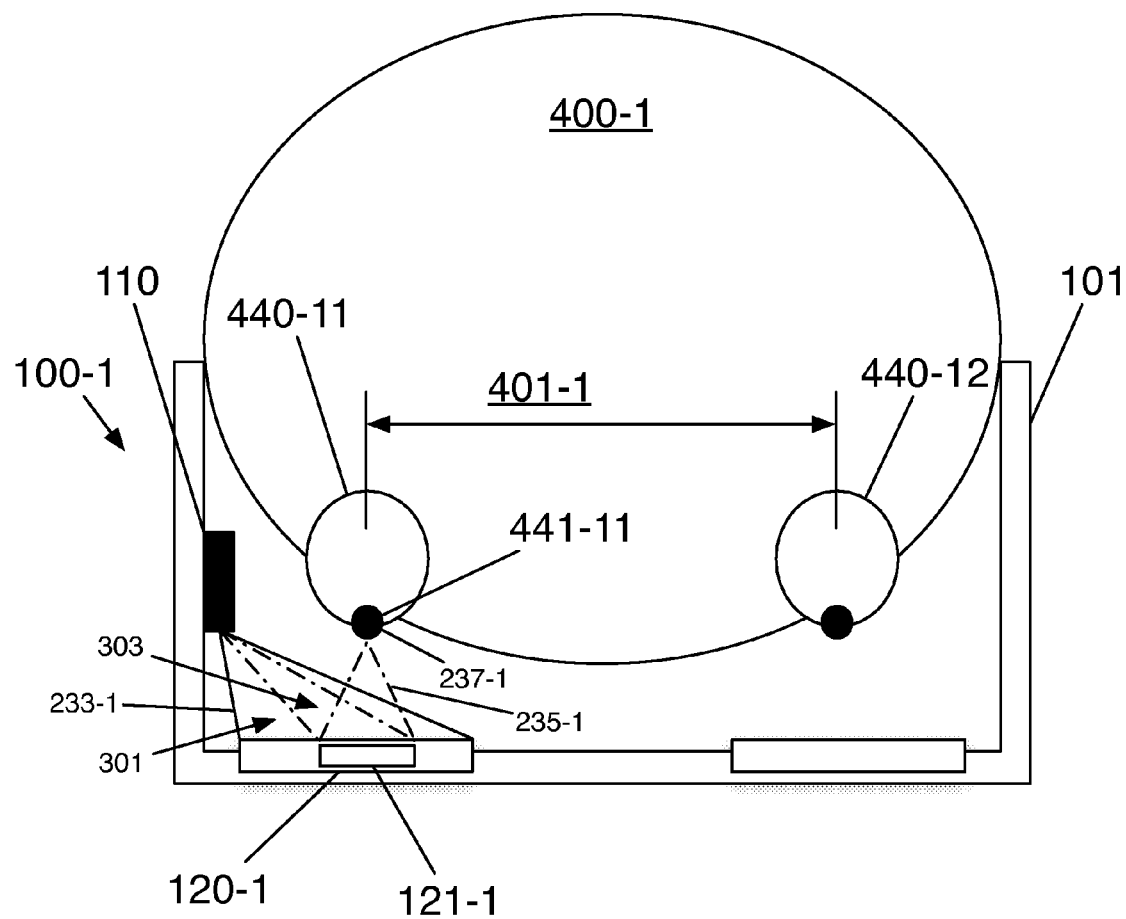
Figure 5A:
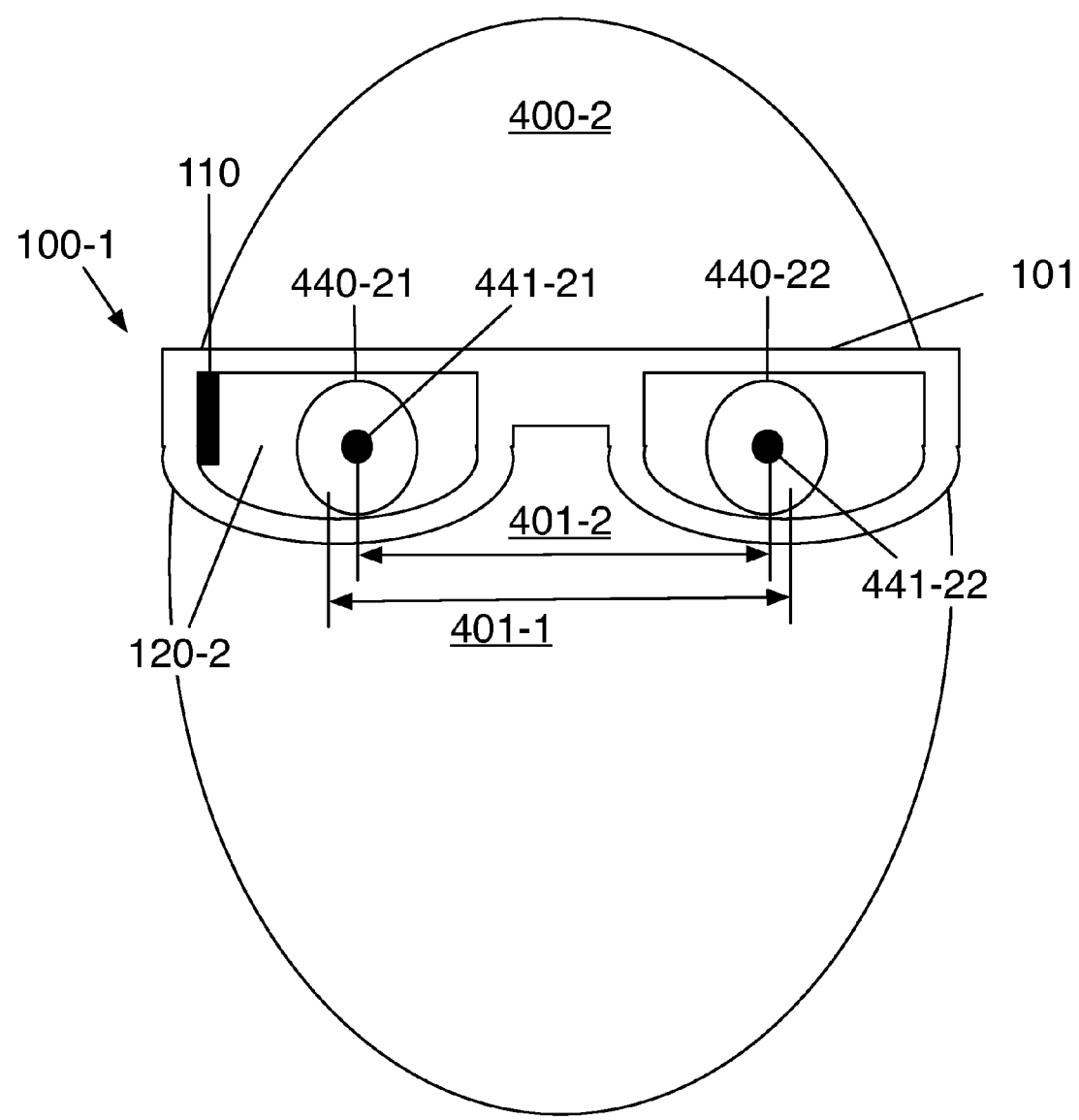
FIGS. 5A-5C illustrate example implementations of the first system.
Figure 5B:
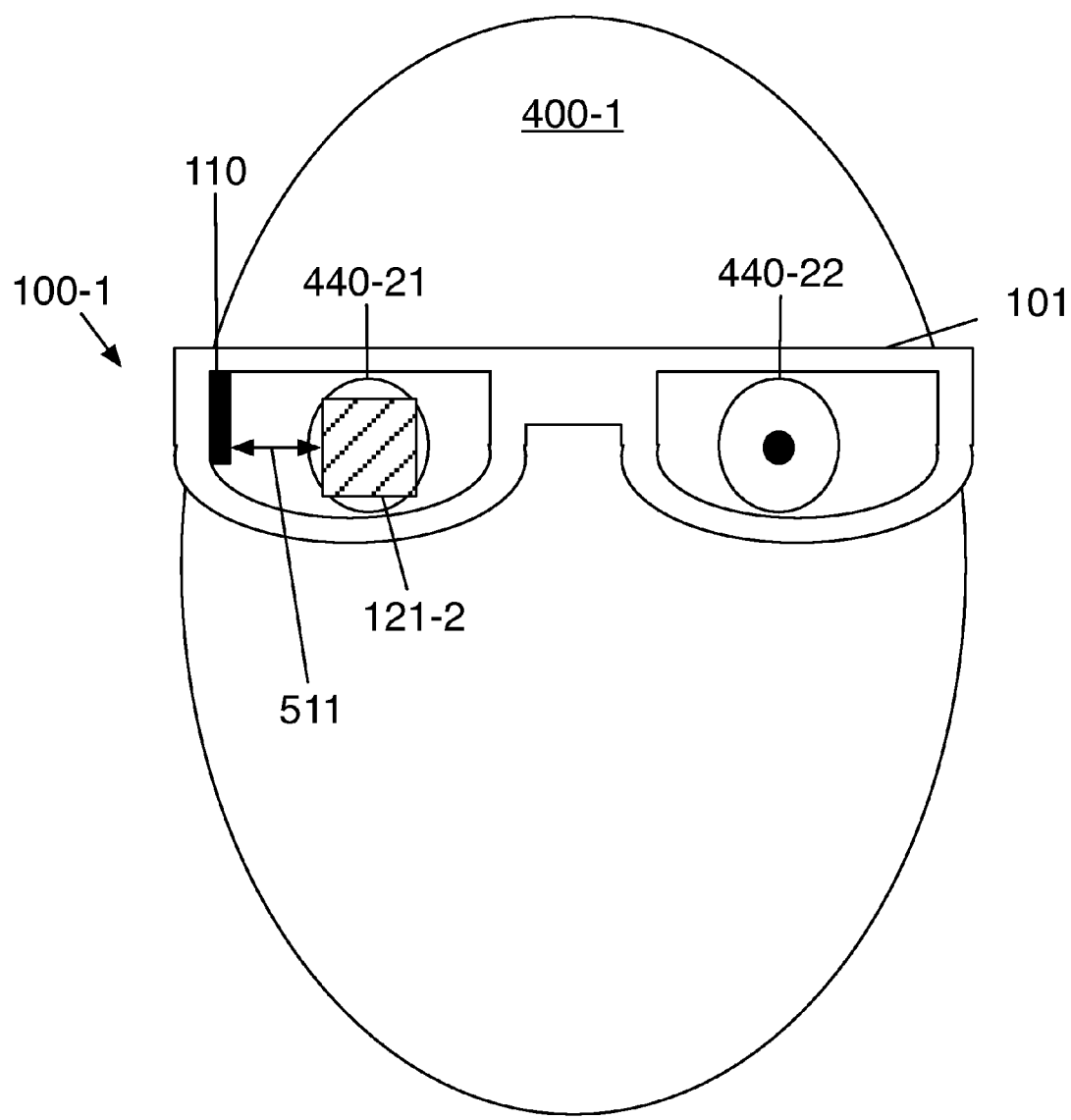
Figure 5C:
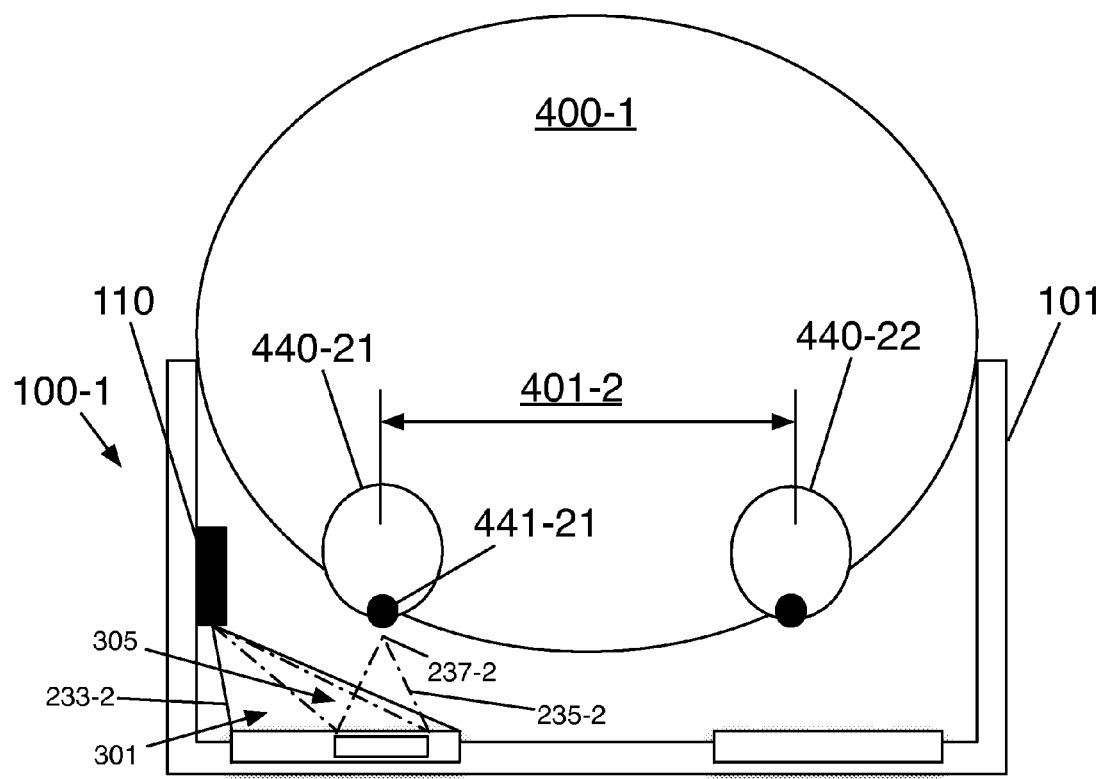

Any of a number of lenses, like the lens 120, each with an HOE 121 in a different location and/or with different optical characteristics may be removably coupled to the frame 101 to provide a virtual image or a combination of a virtual image and a real world view for different users, each with a different IPD. This is described in greater detail below, for example, with respect to FIGS. 4A-4C and FIGS. 5A-5C. However, in general, FIGS. 4A-4C depict the device 110 provisioned with a first lens 120-1 worn by a first user 400-1 while FIGS. 5A-5C depict the device 110 provisioned with a second lens 120-2 worn by a second user 400-2. It is noted, that the user 400-1 has a different IPD than the user 400-2 (e.g., the eyes of the user 400-2 are closer together than the eyes of the user 400-1). Each of the lenses 120-1 and 120-2 have an HOE configured to reflect a projected image for a specific IPD. Accordingly, as will be described in greater detail below: the device 100, provisioned with the lens 120-1, projects an image to an exit pupil for the user 400-1; and the device 100, provisioned with the lens 120-2, projects an image to an exit pupil for the user 400-2. Accordingly, the HOE 121 may be configured (e.g., positioned, optically tailored, or the like) for a particular IPD (e.g., an IPD of a user, or the like).

The positioning and/or optical characteristics of the HOE 121 and the relation to a user's IPD is described in greater detail below. However, the location or optical characteristics of the HOE 121 affect the exit pupil (e.g., viewpoint) of the virtual image reflected from the lens 120. As noted, the lens 120 including the HOE 121 may be removably disposed in the frame 101. Accordingly, a lens 120 with an HOE 121 corresponding to an IPD value (or corresponding to a range of IPDs, or the like) may be provided and/or coupled to the frame 101. As such, the device 100 may project a virtual image for the particular IPD (or range of IPDs). Additionally, a different lens with a differently configured HOE (e.g., corresponding to a different IPD value, or the like) may be provided and/or coupled to the frame 101. As such, the device 100 may project a virtual image for the different IPD value.

In some examples, the lens 120 may comprise a layer of holographic material coated onto one or both sides of the lens. For example, the lens 120 may comprise a photopolymer coated lens where the photopolymer is holographically recorded to form the HOE 121. As another example, the lens 120 may comprise a photopolymer layer disposed between two lens surfaces (e.g., protective layers, transparent layers, or the like). As noted, the holographic material acts to redirect the light projected from the projection system 110 into the eye while transmitting the light from the environment into the eye.

It is important to note, that the projection system 110 may not necessarily need to be mechanically adjusted and/or repositioned with respect to the lens 120. Instead, as will be described in greater detail below, the projection system 110 may be configured to project an image over an area of the lens 120 corresponding to the HOE 121 (e.g., the area 303 or the area 305 depicted in FIG. 3C, or the like) to project a virtual image to an exit pupil corresponding to the HOE 121.

For example, FIG. 2 is a block diagram illustrating a side view of a system 200 including an example implementation of the device 100. In general, the exemplary implementation of the device 100 depicted in this figure is configured to project light to a single exit pupil 237 (e.g., proximate to, or directed at, a user's eye, or the like). That is, the device 100 is configured to reflect the image projected onto the HOE 121 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 120 while the system 110 modulates or modifies the intensity of the scanned light beam 231 to correspond to a digital image. In particular, the scanning mirror 115 scans the light beam 231 over an area of lens 120 while the system 110 projects a digital image onto a portion of the area that includes the HOE 121. This is explained in greater detail below, for example, with respect to FIGS. 3A-3C.

In some examples, the lens 120 comprises an HOE 121 disposed between two protective layers 122 and 123. It is noted, that a variety of styles of HOEs may be implemented as the HOE 121. Furthermore, the HOE 121 may be manufactured by any of variety of manufacturing techniques, such as, for example, recording a hologram into a medium. Examples are not limited in this context.

For example, the HOE 121 may be a combiner lens (e.g., a holographic optical combiner lens, or the like) that reflects light (e.g., off-angle light, or the like) incident on a first surface while transmitting light incident on a second opposite surface. Accordingly, the lens 120 reflects the light 233 as diffracted light 235 to an exit pupil 237. Thus, the lens 120 reflects and diffracts the light 233 to the entrance pupil 241 of a user's eye 240. Furthermore, the lens 120, and particularly the HOE 121, transmits light 239, which is incident on a front side of the lens 120 and HOE 121. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

FIGS. 3A-3C illustrate additional example implementations of the device 100. In particular, FIGS. 3A-3B are perspective views of the device 100-a with a removable lens 120-a disposed in the frame 101 while FIG. 3C is a block diagram of a top view of the device 100 reflecting light based on the lenses 120-a, where "a" is a positive integer. It is noted, as described above, the lenses 120-a may be provided and coupled to the frame 101 to provide the device 100 configured to project an image for a particular IPD of a user.

For example, a lens 120-1 is depicted removably coupled to the frame 101 in FIG. 3A while a lens 120-2 is depicted removably coupled to the frame 101 in FIG. 3B. to form device 100-1 and device 100-2, respectively. It is noted, that although only two lenses 120-1 and 120-2 are depicted, the device 100-a and, in particular, the frame 101 may be configured to receive any number of lenses. More specifically, the frame 101 and the projection system 110 are consistent between devices 100-1 and 100-2 while the removable lens 120-a with an HOE 121-a is different. That is, lens 120-1 is disposed in frame 101 for device 100-1 while lens 120-2 is disposed in frame 101 for device 100-2.

Turning more specifically to FIG. 3A, the lens 120-1 is depicted including an HOE 121-1 in a first location. It is noted, that the HOEs 121-a depicted herein are depicted as square for convenience and clarity. However, the HOEs may be any shape or geometry suitable for a given implementation, such as for example rectangular, circular, polygonal, or the like.

Turning more specifically to FIG. 3B, the lens 120-2 is depicted including an HOE 121-2 in a second location, different than the first location. In particular, the location of the HOE 121-2 has been shifted horizontally from the location of the HOE 121-1. It is noted, that the examples used herein depict HOEs with locations shifted horizontally. However, a lens 120-a may be provided with a position of an HOE 121-a in the lens shifted horizontally and/or vertically relative to another HOE 121-a in another lens 120-a.

Turning more specifically to FIG. 3C, a top view of the device 100 with a lens 120-a is depicted. It is noted, that the lens 120-a depicted in this figure is shown with HOE 121-1 (dashed-dotted line) and 121-2 (dashed-double-dotted line) in horizontal locations within the lens 120-a. This is done for clarity in describing the reflection of light from the HOEs 121-a based on their position relative to the projection system 110. However, it is noted, that the lens 120-a need not be provided with both the HOE 121-1 and 121-2. In particular, the lens 120-a may be provided with either the HOE 121-1 or the HOE 121-2, or another HOE 121-a in a different location.

During operation, the projection system 110 projects light 233 onto the lens 120. For example, the projection system (e.g., by rotating the mirror 115, or the like) scans light 233 over an area of the lens 120-a to include the area 301 (e.g., defined by solid lines) where an HOE (e.g., HOE 122-1, the HOE 122-2, or the like) is positioned.

Additionally, the projection system 110 is configured to modulate and/or otherwise modify the light 233 to project an image onto a portion of the area 301 (e.g., defined by solid lines). Furthermore, the projection system 110 may be configured to scan light 233 over the area 301 and to modulate the light 233 to project an image onto an area 303 (e.g., defined by dashed-dotted lines) corresponding an area of the lens 120-a where the HOE 121-1 is positioned. Accordingly, the HOE 121-1 may reflect and diffuse the light 233 as light 235-1 to project an image to exit pupil 237-1. As another example, the projection system 110 may be configured to scan light 233 over the area 301 and modulate the light 233 to project an image onto an area 305 (e.g., defined by dashed-double-dotted lines) corresponding an area of the lens 120-a where the HOE 121-2 is positioned. Accordingly, the HOE 121-2 may reflect and diffuse the light 233 as light 235-2 to project an image to exit pupil 237-2.

It is noted, that the exit pupils 237-a are offset from each other in a horizontal direction. Said differently, the exit pupils are shifted horizontally. Accordingly, a lens (e.g., the lens 121-1, 121-2, or the like) may be provided and the projection system 110 configured to provide an exit pupil (e.g., the exit pupil 237-1, the exit pupil 237-2, or the like) for a particular IPD.

FIGS. 4A-4C and 5A-5C depict example implementations of the device 100 for two different users, respectively, each having different IPDs. It is noted, that these example implementations, the hypothetical user's and their hypothetical IPDs are provided for convenience and clarity in discussing the examples of the present disclosure. Furthermore, these figures are not drawn to scale. Examples are not limited in any of these respects.

Turning more particularly to FIGS. 4A-4C, these figures depict the example implementation of the device 100-1 provided to a user 400-1. In FIG. 4A, the user 400-1 is depicted including eyes 440-11 and 440-12, and a corresponding IPD 401-1. More specifically, the distance between the input pupils 441-11 and 441-12 of the user's eyes 440-11 and 440-12 is the IPD 401-1.

The user 400-1 is depicted wearing the device 100-1, which has the removable lens 120-1 operably coupled therein. In FIG. 4B, the lens 120-1 is depicted with the HOE 121-1 in a particular location. More specifically, the HOE 121-1 is depicted disposed a horizontal distance 411 away from the projection system 110. In FIG. 4C, a top view of the user 400-1 wearing the device 100-1 is depicted. The projection system 110 is depicted projecting light 233-1 over the area 301 and modulating the light 233-1 to project an image over area 303 corresponding to the location of the HOE 121-1. The image is reflected by the HOE 121-1 as light 235-1 to exit pupil 237-1. The exit pupil 237-1 is proximate to the input pupil 441-11 of the users eye 440-11. Accordingly, by providing the lens 120-1, and particularly by coupling the lens 120-1 to the frame 101 to form the device 100-1, a HWD with a lens and an HOE to provide an exit pupil (e.g., the exit pupil 237-1) for a particular users IPD is provided.

Turning more particularly to FIGS. 5A-5C, these figures depict the example implementation of the device 100-2 provided to a user 400-2. In FIG. 5A, the user 400-2 is depicted including eyes 440-21 and 440-22, and a corresponding IPD 401-2. More specifically, the distance between the input pupils 441-21 and 441-22 of the user's eyes 440-21 and 440-22 is the IPD 401-2. It is noted, that the IPD 401-2 is less than the IPD 401-1. Said differently, the distance between the eyes of the user 400-2 is less than the distance between the eyes of the user 440-1.

The user 400-2 is depicted wearing the device 100-2, which has the removable lens 120-2 operably coupled therein. In FIG. 5B, the lens 120-2 is depicted with the HOE 121-2 in a particular location. More specifically, the HOE 121-2 is depicted disposed a horizontal distance 511 away from the projection system 110. It is noted that the distance 511 is greater than the distance 411. In FIG. 5C, a top view of the user 400-2 wearing the device 100-2 is depicted. The projection system 110 is depicted projecting light 233-2 over the area 301 and modulating the light 233-2 to project an image over area 305 corresponding to the location of the HOE 121-2. The image is reflected by the HOE 121-2 as light 235-2 to exit pupil 237-2. The exit pupil 237-2 is proximate to the input pupil 441-21 of the users eye 440-21. Accordingly, by providing the lens 120-2, and particularly by coupling the lens 120-2 to the frame 101 to form the device 100-2, a HWD with a lens and an HOE to provide an exit pupil (e.g., the exit pupil 237-2) for a particular users IPD is provided.

Accordingly, as depicted in FIGS. 4A-4C and 5A-5C, a HWD configured to receive a removable lens (e.g., the lens 120-1, the lens 120-2, or the like) may be provided to provide a HWD with an eyebox (e.g., exit pupil or the like) for different IPDs. Accordingly, the device 100 may be configured for a particular user by, for example, measuring the user's IPD (e.g., in an optometrist office, using digital tools, or the like) and fixing the appropriate lens 120-a into the frame 101.

Figure 6:
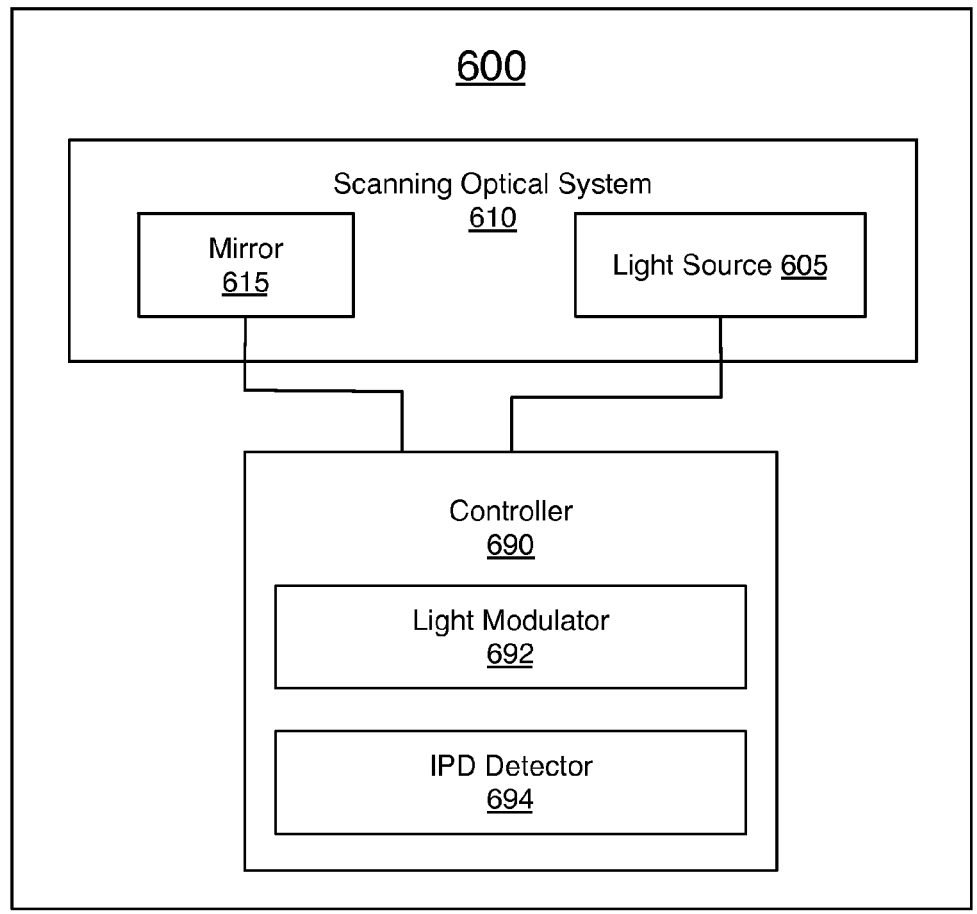
FIG. 6 illustrates an example third system.

FIG. 6 depicts a block diagram of an optical projection system 600. In some examples, the optical projection system 600 may be implemented as the projection system 110 described herein. In general, the system 600 may be provided to project light over a large area (e.g., corresponding to a wide range of IPDs, the area 301, or the like) and during operation, to modulate the light to project an image over a portion of the area (e.g., corresponding to a location of an HOE, the area 303, the area 305, or the like).

The system 600 may include a scanning optical system 610. The scanning optical system 610 may include a light source 605 (e.g., a laser, an LED, or the like). Additionally, the system 610 includes a mirror 615. The mirror 615 may be a MEMS based mirror configured to rotate about a number of axes to scan light emitted from the light source across a projection surface (e.g., the lens 120-a, the area of the HOE 121-a, or the like).

The system 600 may also include a controller 690. In general, the controller 690 may comprise hardware and/or software and may be configured to execute instructions to cause the controller 690 to send one or more control signals to light source 605 and/or the mirror 615 to cause the light source 605 to emit light and the mirror 615 to rotate about a number of axes to project the light over a particular area corresponding to the HOE of a lens removably fixed in a frame of a device to which the system 600 is disposed.

The controller 690 may include a light modulator 692 configured to modulate the light source 605 and/or the mirror 615 to cause the scanning optical system 610 to scan light over a first area and to project an image over a second area smaller than the first area, where the second area is located within the first area. For example, the light modulator 692 may cause the system 610 to scan light 233 over the area 301 and to modulate the light to project an image over the area 303 or 305. For example, the light modulator 692 may send a control signal to the light source 605 and/or the mirror 615 to project the image over a portion of the overall scanning area corresponding to the location of an HOE (e.g., the area 303, the area 305, or the like).

The controller 690 may also include an IPD detector 694. With some examples, the IPD detector may receive an information element to include an indication of an IPD (e.g., the IPD 401-1, 401-2, or the like) or an indication of a location of an HOE (e.g., the horizontal displacement from the projector (e.g., the displacement 411, the displacement 511, or the like). For example, the IPD detector 694 may receive an information element from a smart phone (or the like) to include an indication of the location of the HOE in the lens 120-*a* removably coupled to the frame 101.

With some examples, the lens 120 may include an RFID emitter. The IPD detector 694 may receive an information element from the lens 120-*a* (e.g., from the RFID emitter, or the like) to include an indication of the location of the HOE in the lens.

With some examples, the lens 120 may include a contact (e.g., a spatially coded electronic contact, or the like) that may electrically communicate with a contact (e.g., a spatially coded electronic contact) on the frame 101. The IPD detector 694 may receive a control signal from the contact on the frame to include an indication of the contact on the lens 120 to determine a location of the HOE in the lens 120.

In some examples, the lens 120 may include a reflective element to reflect light back at the projection system 110. The IPD detector 694 may send a control signal to the light source 605 and the mirror 615 to cause the light source 605 and the mirror 615 to project a light at the portion of the lens 120 that includes the reflector. The light may be reflected back to the projection system and received (e.g., by a photodiode or the like) to detect the lens, and particularly, the location of the HOE 121-*a* in the lens 120-*a*.

Figure 7:
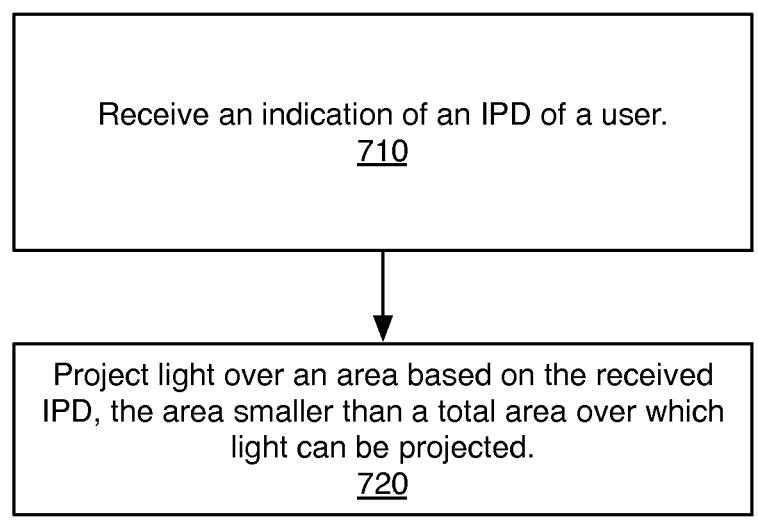
FIG. 7 illustrate an example first logic flow.

FIG. 7 depicts a logic flow 700 for projecting a virtual image. The logic flow 700 may begin at block 710. At block 710 "receive an indication of an IPD of a user," the controller 690 may receive an indication (e.g., control signal, information element, or the like) to include an indication of an IPD (e.g., the IPD 401-1, 401-2, or the like) of a user. In some examples, the received IPD may correspond to an IPD of a user to wear the device 100. In some examples, the received IPD may correspond to an IPD of a lens 120-*a* removably disposed in the frame 101. In some examples, the received IPD may correspond to a location (e.g., horizontal displacement 411, 511, or the like) of an HOE 121 removably disposed in the frame 101.

Continuing to block 720 "project an image over an area based on the received IPD, the area smaller than a total area over which light is scanned." At block 720 the controller 690 may send a control signal to the light source 605 and/or the mirror 615 to cause the system 610 to project an image over an area (e.g., the area 303, 305, or the like) corresponding to the received IPD, where the area over which the image is projected is less than the area over which light is scanned (e.g., the area 301, or the like).

Figure 8:
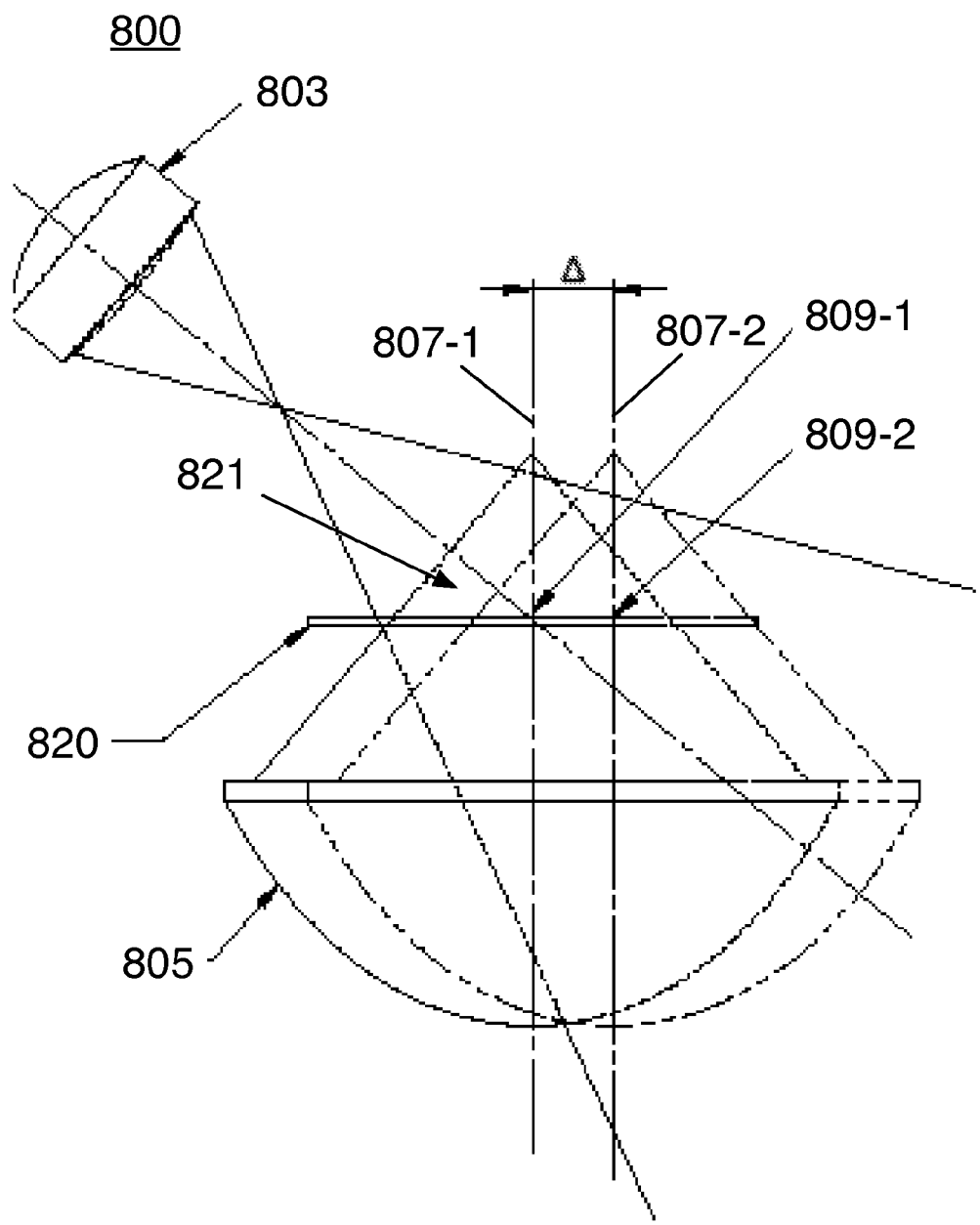
FIG. 8 illustrate an example fourth system.
Figure 9:
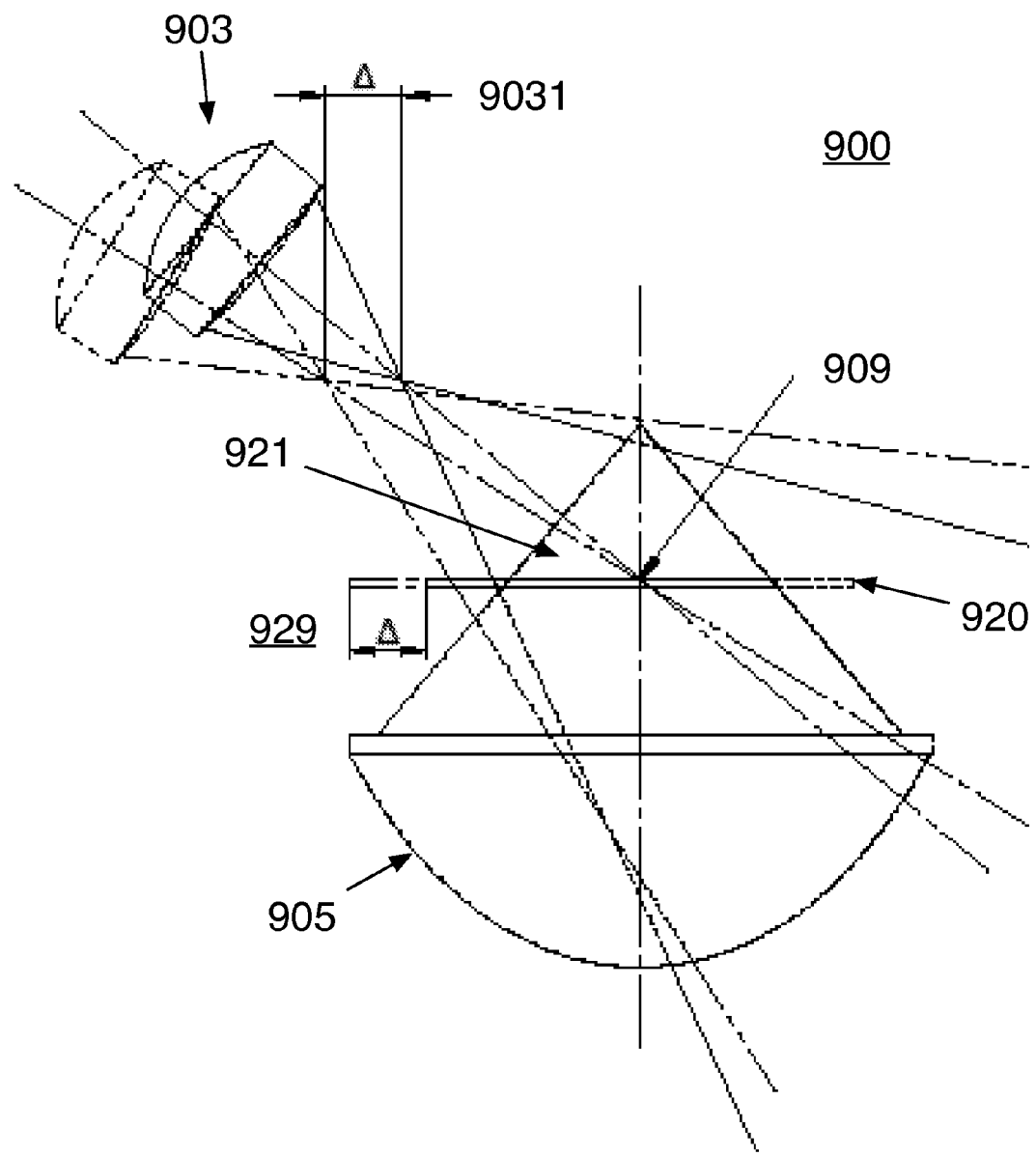
FIG. 9 illustrate an example fifth system.

HOEs, such as, for example, the HOEs 121-*a*, are fabricated by interfering a reference beam and an object beam. In particular, the reference beam and the object beam are directed at the lens and intersect along a portion of the lens to form the HOE. FIGS. 8-9 are block diagrams of example systems for interfering an object beam with a reference beam to form an HOE.

Turning more specifically to FIG. 8, a system 800 for recording an HOE 821 in a lens 820 is depicted. The system 800 includes a fixed reference beam 803 and a moveable object beam 805 with a moveable center position 807-*a*. Additionally, the lens 820 is fixed. Accordingly, the object beam can be moved to form an HOE in different portions of the lens 820. For example, the object beam 805 is shown with a first center position 807-1 and a second center location 807-2. In particular, the object beam 805 may be adjusted to have a center position 807-1 to form an HOE with a center position 809-1. Alternatively, the object beam 805 may be adjusted to have a center position 807-2 to form an HOE with a center position 809-2.

Turning more specifically to FIG. 9, a system 900 for recording an HOE 921 in a lens 920 is depicted. The system 900 includes a fixed object beam 905 and a moveable reference beam 903. Additionally, the lens 920 is configured to be moved. For example, the lens 902 may be moved along displacement 929. Accordingly, during operation, the reference beam 903 is moved along trajectory 9031 to interfere with the fixed object beam 905 to form an HOE with a center position 907. To form an HOE with a center position 907 in a different location of the lens 920, the lens may be moved, for example, along displacement 929.

FIG. 10 depicts a logic flow 1000 for manufacturing an HOE in a lens. The logic flow 1000 may begin at block 1010. At block 1010 "project an object beam and a reference beam to interfere with each other to form an HOE having a center in a first position of the lens," the reference beam 903 and the objet beam 905 may be projected to interfere with each other to form an HOE in a lens. For example, the HOE 821 and/or 921 may be formed in the lenses 820 and/or 920, respectively.

Continuing to block 1020 "displace at least one of the reference beam, the object beam, or the lens to change the position of the center of the HOE along a horizontal direction of the lens" the reference beam 903, the object beam 905, and/or the lens (e.g., 820, 920, etc.) can be displaced to change a center positon of the HOE. For example, the reference beam 903, the object beam 905 and/or the lenses 820/920 may be displaced to change a center position (e.g., 809-1, 809-2, 909, etc.) of the HOE.

In some examples, the object beam 805 may be displaced from position 807-1 to 807-2 to change the center of the HOE 821 from 809-1 to 809-2. In some examples, the lens 920 may be displaced along displacement 929 to change the center position 929 of the HOE 921 to a different position in the lens 920.

Figure 11:
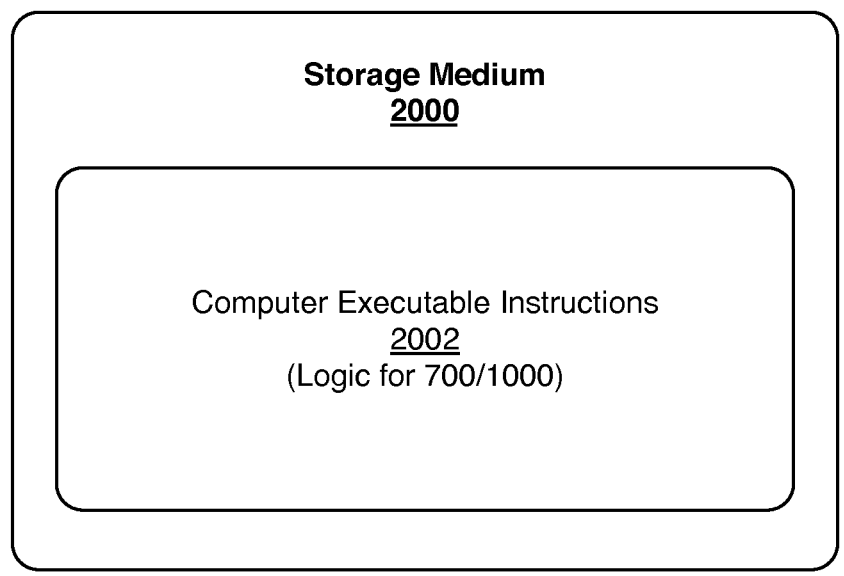
FIG. 11 illustrates an example computer readable medium.

FIG. 11 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 700. For example, the storage medium 2000 may store various types of computer executable instructions to implement technique 1000.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
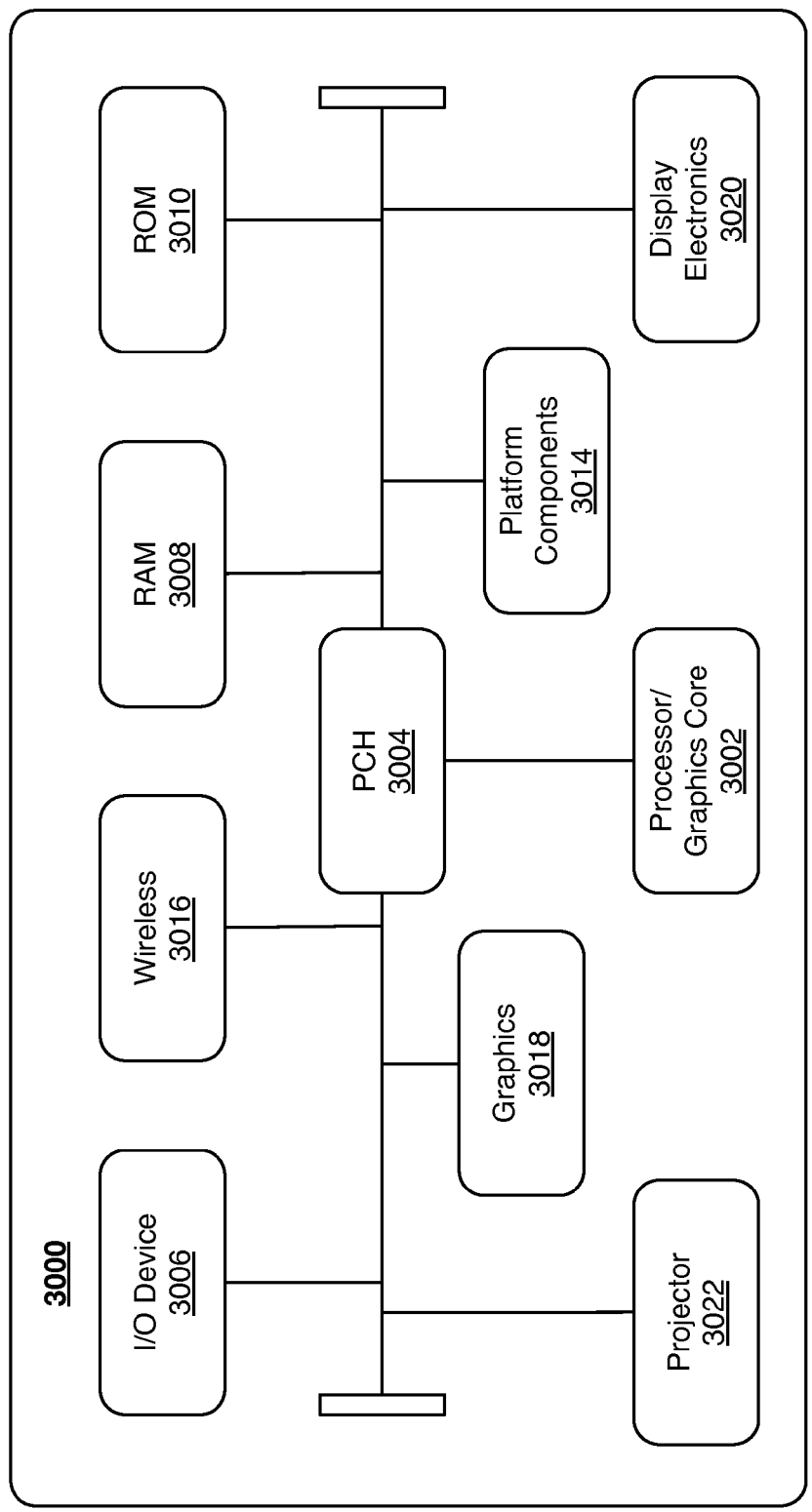
FIG. 12 illustrates a third example system.

FIG. 12 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., lens 120, lens 820, lens 920, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus, comprising: a projection surface, the projection surface comprising a holographic optical element (HOE) in a first location; a projector to project light onto at least a portion of the projection surface comprising the first location; anda controller to send a control signal to the projector to cause the projector to project an image onto the first location.

EXAMPLE 2

The apparatus of example 1, the HOE to reflect light incident on the HOE to a first exit pupil.

EXAMPLE 3

The apparatus of example 2, comprising a frame, the projector coupled to the frame and the projection surface removably coupled to the frame.

EXAMPLE 4

The apparatus of example 3, wherein the projection surface is a first projection surface and the HOE is a first HOE, the frame to removably receive a second projection surface, the second projection surface comprising a second HOE disposed in a second location on the projection surface.

EXAMPLE 5

The apparatus of example 4, the second HOE to reflect light incident on the second HOE to a second exit pupil, the first exit pupil displaced from the second exit pupil relative to the projector.

EXAMPLE 6

The apparatus of example 5, the controller to receive an information element to include an indication of the first location or the second location and to send the control signal to the projector to cause the projector to project the image in either the first location or the second location.

EXAMPLE 7

The apparatus of example 5, the first projection surface to have a first area and the second projection surface to have a second area, the first and second area substantially the same.

EXAMPLE 8

The apparatus of example 7, the first HOE to have a third area and the second HOE to have a fourth area, the third and fourth area substantially the same.

EXAMPLE 9

The apparatus of example 8, the first location offset from the second location in a horizontal direction relative to the projector.

EXAMPLE 10

The apparatus of example 8, the first location offset from the second location in a vertical direction relative to the projector.

EXAMPLE 11

The apparatus of any one of examples 1 to 10, wherein the first location corresponds to a first IPD and the second location corresponds to a second IPD different than the first IPD.

EXAMPLE 12

The apparatus of any one of examples 1 to 10, wherein the projection surface is a glasses lens, a goggle lens, or a helmet visor.

EXAMPLE 13

The apparatus of example 12, wherein the frame is glasses, goggles, or a helmet.

EXAMPLE 14

An apparatus comprising: a projector to scan a light beam over a first projection surface, the first projection surface comprising a first holographic optical element (HOE) disposed in a first location on the first projection surface; and a controller to send a control signal to the projector to cause the projector to project an image in the first location.

EXAMPLE 15

The apparatus of example 14, the projector to scan the light beam over a second projection surface, the second projection surface comprising a second HOE disposed in a second location on the second projection surface, the first location different than the second location.

EXAMPLE 16

The apparatus of example 15, the controller to send a control signal to the projector to cause the projector to project the image in the second location.

Example 17

The apparatus of example 16, the controller to receive an information element to include an indication of the first location or the second location and to send the control signal to the projector to cause the projector to project the image in either the first location or the second location.

EXAMPLE 18

The apparatus of example 17, the information element to include an indication that either the first projection surface or the second projection surface is optically coupled to the apparatus.

EXAMPLE 19

The apparatus of example 16, the first HOE to reflect light incident on the first HOE to a first exit pupil.

EXAMPLE 20

The apparatus of example 19, the second HOE to reflect light incident on the second HOE to a second exit pupil, the first exit pupil displaced from the second exit pupil relative to the projector.

EXAMPLE 21

The apparatus of any one of examples 14 to 20, wherein the first location corresponds to a first IPD and the second location corresponds to a second IPD different than the first IPD.

EXAMPLE 22

A system for projecting an image, the system comprising: a frame to removably receive a first one of a plurality of projection surfaces, each of the plurality of projection surfaces comprising a holographic optical element (HOE) in a location; and a projection system coupled to the frame, the projection system comprising: a projector to project light onto a first one of the plurality of projection surfaces; and a controller to send a control signal to the projector to cause the projector to project an image in the location of the HOE of the first one of the projection surfaces.

EXAMPLE 23

The system of example 22, the frame to removably receive a second one of the plurality of projection surfaces.

EXAMPLE 24

The system of example 23, the controller to receive an information element to include an indication of the first one of the plurality of projection surfaces or the second one of the plurality of projection surfaces.

EXAMPLE 25

The system of example 24, the controller to send the control signal to the projector to cause the projector to project the image in the location of the HOE of either the first one of the plurality of projection surfaces or the location of the HOE of the second one of the plurality of projection surfaces based on the information element.

EXAMPLE 26

The system of example 23, the location of the HOE of the first one of the plurality of projection surfaces different than the location of the HOE of the second one of the plurality of projection surfaces.

EXAMPLE 27

The system of example 26, the location of the HOE of the first one of the plurality of projection surfaces offset from the location of the HOE of the second one of the plurality of projection surfaces.

EXAMPLE 28

The system of example 27, the locations offset in a horizontal direction relative to the projection system.

EXAMPLE 29

The system of example 27, the locations offset in a vertical direction relative to the projection system.

EXAMPLE 30

The system of any one of examples 22 to 29, wherein the location of the HOE in each of the plurality of projection surfaces corresponds to a different IPD.

EXAMPLE 31

The system of any one of examples 22 to 29, wherein the projection surface is a glasses lens, a goggle lens, or a helmet visor.

EXAMPLE 32

The system of example 31, wherein the frame is glasses, goggles, or a helmet.

EXAMPLE 33

The system of any one of examples 22 to 29, comprising a battery electrically coupled to the projector.

EXAMPLE 34

The system of any one of examples 22 to 29, comprising a graphic processor to receive an image information element to include an indication of the image and the send a display control signal to the projector to cause the projector to project one or more pixels corresponding to the image.

EXAMPLE 35

A method to project a virtual image, the method comprising: projecting a light beam onto a projection surface, the projection surface comprising a holographic optical element (HOE) disposed in a first location; projecting an image onto the first location; and reflecting the image from the HOE to a first exit pupil.

EXAMPLE 36

The method of example 35, wherein the projection surface is a first projection surface and the HOE is a first HOE, the method comprising: projecting a light beam onto a second projection surface, the second projection surface comprising a second HOE disposed in a second location; projecting an image onto the second location; and reflecting the image from the second HOE to a second exit pupil.

EXAMPLE 37

The method of example 36, comprising: receiving an information element to include an indication of the first location or the second location; andprojecting the image based on the information element.

EXAMPLE 38

The method of example 36, the first projection surface to have a first area and the second projection surface to have a second area, the first and second area substantially the same.

EXAMPLE 39

The method of example 38, the first HOE to have a third area and the second HOE to have a fourth area, the third and fourth area substantially the same.

EXAMPLE 40

The method of example 39, the first location offset from the second location in a horizontal direction.

EXAMPLE 41

The method of example 39, the first location offset from the second location in a vertical direction.

EXAMPLE 42

The method of any one of examples 36 to 41, wherein the first location corresponds to a first IPD and the second location corresponds to a second IPD different than the first IPD.

EXAMPLE 43

The method of any one of examples 35 to 41, comprising: emitting the light beam from a light source; receiving the light beam at a mirror; androtating the mirror to scan the light beam onto the projection surface.

EXAMPLE 44

The method of example 43, comprising sending a control signal to at least one of the light source or the mirror to cause an image to be projected in the first location.

EXAMPLE 45

An apparatus comprising means to perform the method of any one of examples 35 to 44.

EXAMPLE 46

A method of manufacturing a projection surface, the method comprising: providing a projection surface material; interfering a reference beam and one or more object beams at the projection surface to form a holographic optical element (HOE), the HOE to reflect incident light to a first exit pupil; and moving at least one of the reference beam, the one or more object beams, or the projection surface to change the HOE to reflect incident light to a second exit pupil different than the first exit pupil.

EXAMPLE 47

The method of example 46, comprising: directing the reference beam at a portion of the projection surface; and directing the one or more object beams at the portion of the projection surface.

EXAMPLE 48

The method of example 46, comprising directing a plurality of object beams at the projection surface, the HOE to reflect incident light to a plurality of exit pupils.

EXAMPLE 49

The method of example 46, comprising moving the one or more object beams to change a center location of the HOE in the projection surface.

EXAMPLE 50

The method of example 46, comprising moving the reference beam and the projection surface to change a center location of the HOE in the projection surface.

EXAMPLE 51

A lens for a head worn display prepared by the method of any one of examples 46 to 50.

What is claimed is:

1. A system for projecting an image, the system comprising:
    a frame to removably receive a plurality of projection surfaces, one at a time, each of the plurality of projection surfaces comprising a holographic optical element (HOE) at a location on the respective projection surface to reflect a projected image for a select interpupillary distance (IPD) when the respective projection surface is received in the frame, each HOE different in location and/or optical characteristics compared to the other HOEs; and
    a projection system coupled to the frame, the projection system comprising:
        a projector to project light onto a first select one of the plurality of projection surfaces received in the frame: and
        a controller to receive an information element including an indication of an IPD of a user, determine a location of the HOE of the select one of the plurality of projection surfaces based on the indication of the IPD of the user, and send a control signal to the projector to cause the projector to project an image in onto the location of the HOE of the select one of the projection surfaces.

2. The system of claim 1, wherein the location of each HOE when the respective projection surface is received in the frame is offset in at least one of a horizontal direction relative to the projection system and a vertical direction relative to the projection system compared to the other HOEs when their respective projection surfaces are received in the frame.

3. The system of claim 1, wherein the projection surface is a glasses lens, a goggle lens, or a helmet visor and wherein the frame is glasses, goggles, or a helmet.

4. The system of claim 1, comprising a battery electrically coupled to the projector.

5. The system of claim 1, comprising a graphic processor to receive an image information element to include an indication of the image and to send a display control signal to the projector to cause the projector to project one or more pixels corresponding to the image.

6. The system of claim 1, wherein each of the plurality of projection surfaces includes at least one of an RFID emitter, an electrical contact, and a reflective element to provide the information element to the controller.

7. A method to project a virtual image, the method comprising:
    receiving an information element including an indication of an interpupillary distance (IPD) of a user;
    determining a location of a holographic optical element (HOE) on a projection surface removably received in a frame based on the received indication of the IPD of the user;
    sending a control signal to a projector coupled to the frame to project an image onto the location of the HOE;
    projecting an the image onto the location of the HOE in response to the control signal;
    reflecting the image from the HOE to an exit pupil; and
    selecting the projection surface from a plurality of projection surfaces removably receivable within the frame, each of the plurality of projection surfaces comprising a HOE at a location on the respective projection surface is received in the frame, each HOE different in location and/or optical characteristics compared to the other HOEs.

8. The method of claim 7, comprising:
    emitting the light beam from a light source;
    receiving the light beam at a mirror; and
    rotating the mirror to scan the light beam onto the projection surface.

9. The method of claim 8, comprising sending a control signal to at least one of the light source and the mirror to cause an image to be projected in the location of the HOE.

10. The method of claim 7, wherein receiving the information element comprises receiving the information element from the projection surface.

11. The method of claim 7, wherein receiving the information element comprises receiving the information element from the frame.

12. The method of claim 7, wherein receiving the information element comprises receiving the information element from an external device.

* * * * *